(12) United States Patent
Wang et al.

(10) Patent No.: US 12,416,817 B2
(45) Date of Patent: Sep. 16, 2025

(54) GLASSES

(71) Applicant: VIVO MOBILE COMMUNICATION CO., LTD., Guangdong (CN)

(72) Inventors: Wei Wang, Guangdong (CN); Ruixuan Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 458 days.

(21) Appl. No.: 17/982,692

(22) Filed: Nov. 8, 2022

(65) Prior Publication Data

US 2023/0063509 A1 Mar. 2, 2023

Related U.S. Application Data

(63) Continuation of application No. PCT/CN2021/091965, filed on May 6, 2021.

(30) Foreign Application Priority Data

May 9, 2020 (CN) .......................... 202010388688.0

(51) Int. Cl.
*G02C 5/22* (2006.01)
(52) U.S. Cl.
CPC .................................. *G02C 5/2254* (2013.01)
(58) Field of Classification Search
None
See application file for complete search history.

(56) References Cited

U.S. PATENT DOCUMENTS

| | | | |
|---|---|---|---|
| 3,744,886 A | 7/1973 | Filitz | |
| 5,146,649 A | 9/1992 | Da Pra | |
| 6,196,682 B1 * | 3/2001 | Walmsley | G02C 5/001 |
| | | | 351/113 |

(Continued)

FOREIGN PATENT DOCUMENTS

| | | |
|---|---|---|
| CH | 528741 A | 9/1972 |
| CN | 101627331 A | 1/2010 |

(Continued)

OTHER PUBLICATIONS

International Patent Application No. PCT/CN2021/091965, International Search Report and Written Opinion with Partial English Machine Translation mailed Jul. 22, 2021, 9 pages.

(Continued)

*Primary Examiner* — Robert E. Tallman
(74) *Attorney, Agent, or Firm* — Fredrikson & Byron, P.A.

(57) ABSTRACT

Glasses include a main body, a glasses leg, and a connecting device. The glasses leg is connected to an end portion of the main body through the connecting device in such a way that the glasses leg is rotatable. The connecting device includes: a first connecting member, a second connecting member, and an elastic member, where the first connecting member is arranged on the end portion of the main body, a first end of the second connecting member is hinged with the first connecting member, a second end of the second connecting member is hinged with the glasses leg, and the elastic member is located between the second connecting member and the glasses leg, where a first elastic end of the elastic member abuts against the glasses leg, a second elastic end of the elastic member abuts against the second connecting member.

9 Claims, 4 Drawing Sheets

(56) References Cited

U.S. PATENT DOCUMENTS

| | | | | |
|---|---|---|---|---|
| 2019/0011726 A1* | 1/2019 | Filippi | ................ | F16D 65/0006 |
| 2020/0050000 A1* | 2/2020 | Yoshida | ............. | G02B 27/0176 |
| 2021/0255479 A1* | 8/2021 | Lopez | .................. | G02C 5/2254 |

FOREIGN PATENT DOCUMENTS

| | | |
|---|---|---|
| CN | 202003097 U | 10/2011 |
| CN | 105425412 A | 3/2016 |
| CN | 205539770 U | 8/2016 |
| CN | 206684406 U | 11/2017 |
| CN | 207380374 U | 5/2018 |
| DE | 202013000535 U1 | 4/2013 |
| GB | 1223759 A | 3/1971 |
| JP | H10133153 A | 5/1998 |
| JP | 2002221693 A | 8/2002 |
| JP | S6176416 B1 | 8/2017 |
| KR | 1020130003817 A | 1/2013 |
| WO | 2013153662 A1 | 10/2013 |

OTHER PUBLICATIONS

"Common Mechanical Parts and Mechanisms Atlas" With English translation cited in corresponding Chinese Search Report for CN202010388688.0, 12 pgs.

European Patent Office "Extended European Search Report" From Application No. 21803591.3, Dated Oct. 17, 2023, pp. 10.

\* cited by examiner

GLASSES

CROSS-REFERENCE TO RELATED APPLICATIONS

This application is a continuation of International Application No. PCT/CN2021/091965, filed on May 6, 2021, which claims the priority of Chinese Patent Application No. 202010388688.0 filed in China on May 9, 2020, the entire content of which is hereby incorporated by reference.

TECHNICAL FIELD

This application belongs to the field of intelligent wearable technologies, and in particular, to a kind of glasses.

BACKGROUND

Existing smart glasses with a butterfly hinge at the joint of the glasses legs and the frame can be folded inward to reduce the volume and facilitate storage. However, the current solution also has the problems of infirm wearing and low flexibility of the glasses.

SUMMARY

Glasses are provided, which include a main body, a glasses leg, and a connecting device, where the glasses leg is connected to a end portion of the main body through the connecting device in such a way that the glasses leg is rotatable; the connecting device includes a first connecting member, a second connecting member, and an elastic member, where the first connecting member is arranged on the end portion of the main body, a first end of the second connecting member is hinged with the first connecting member, a second end of the second connecting member is hinged with the glasses leg, and the elastic member is located between the second connecting member and the glasses leg, where a first elastic end of the elastic member abuts against the glasses leg, a second elastic end of the elastic member abuts against the second connecting member, and in a case that the glasses leg rotates away from the main body, the elastic member drives the glasses leg and the second connecting member to be away from each other.

BRIEF DESCRIPTION OF MARKS OF THE DRAWINGS

1: main body; 2: glasses leg; 21: leg body; 22: third connecting member; 221: fourth hinge hole; 222: second mounting hole; 3: first connecting member; 31: first limiting portion; 32: first hinge hole; 4: second connecting member; 41: first end; 42: second end; 43: first through hole; 431: first side hole wall; 432: second side hole wall; 44: mounting shaft; 45: first mounting hole; 46: second hinge hole; 47: third hinge hole; 5: first columnar portion; 6: torsion spring; 61: first torsion arm; 62: second torsion arm; 7: first shaft; and 8: second shaft.

DETAILED DESCRIPTION

The following clearly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts fall within the protection scope of this application.

The specification and claims of this application, and terms "first" and "second" are used to distinguish similar objects, but are unnecessarily used to describe a specific sequence or order. It should be understood that the data so used may be interchanged in an appropriate condition, so that the embodiments of this application described herein can be implemented in an order other than those illustrated or described herein. In addition, "and/or" in this specification and the claims represents at least one of the connected objects, and a character "/" generally indicates an "or" relationship between the associated objects.

The following describes the electronic device provided in the embodiments of this application in detail through specific embodiments and application scenarios with reference to the accompanying drawings.

Figure 1:
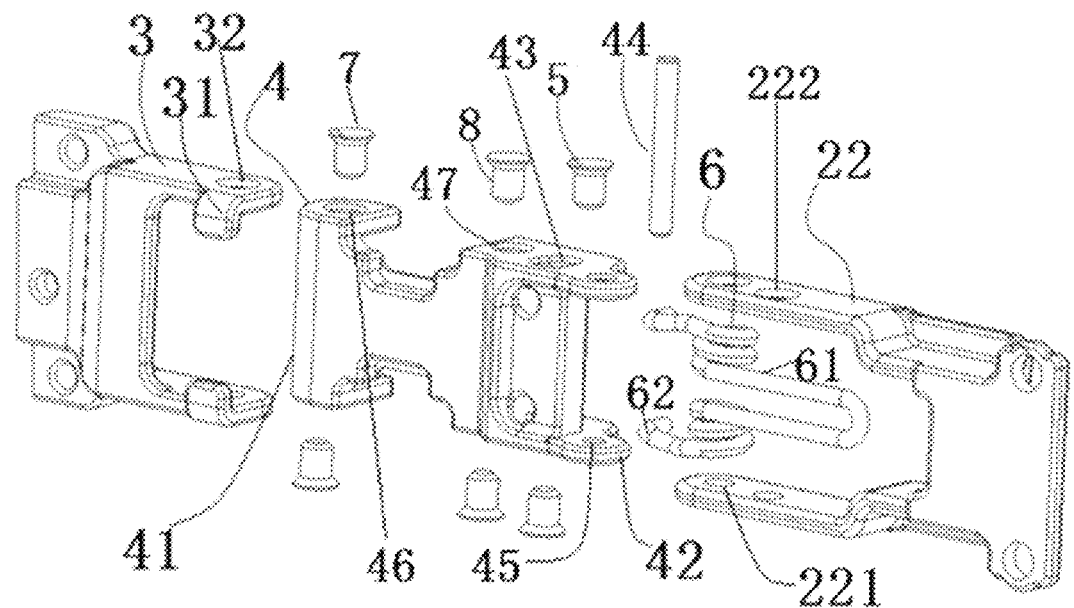
FIG. 1 is a schematic structural diagram of splitting of a connecting device according to an embodiment of this application.

As shown in FIG. 1, an embodiment of this application provides glasses, including a main body 1, a glasses leg 2, and a connecting device, where the glasses leg 2 is connected to an end portion of the main body 1 through the connecting device in such a way that the glasses leg 2 is rotatable. The glasses described in this embodiment are any one of myopia glasses, sunshade glasses, virtual reality (Virtual Reality, VR) glasses, or electronic smart glasses. A type of glasses is not limited in this embodiment of this application. A person skilled in the art may apply this technical solution to the required glasses.

The connecting device includes a first connecting member 3, a second connecting member 4, and an elastic member, where the first connecting member 3 is arranged on the end portion of the main body 1, and may be fixedly connected to the main body 1, so that the main body 1 is stably connected to the glasses leg.

A first end 41 of the second connecting member 4 is hinged with the first connecting member 3. In a form of hinged connection, the second connecting member 4 and the first connecting member 3 form a rotatable engagement relationship, so that a component fixedly connected to the second connecting member 4 can rotate relative to the main body 1 and the first connecting member 3. A second end 42 of the second connecting member 4 is hinged with the glasses leg 2, so that the second connecting member and the glasses leg also form a rotatable engagement relationship.

The elastic member is located between the second connecting member 4 and the glasses leg 2, where a first elastic end of the elastic member abuts against the glasses leg 2, and a second elastic end of the elastic member abuts against the second connecting member 4. Through such an abutting engagement manner, in a case that the glasses leg 2 rotates away from the main body 1, the elastic member drives the glasses leg 2 and the second connecting member 4 to be away from each other. The elastic member is configured to form a pre-tightening elastic force between the second connecting member 4 and the glasses leg 2, so that in actual application, the glasses leg 2 can generate an elastic effect of clamping in an opposite direction when being pulled and rotating relative to the second connecting member 4.

Optionally, a main structure of the elastic member may be fixed on the second connecting member, and the elastic member is mainly in contact with the glasses leg 2 through the first elastic end, to generate an elastic force. In this implementation, the elastic member is closer to the main body 1, which helps to improve the connection reliability among the elastic member, the glasses leg 2, and the main body. In another optional implementation, the main structure of the elastic member may alternatively be fixed on the glasses leg 2, and the elastic member is mainly in contact with the second connecting member 4 through the second elastic end, to generate an elastic force. In this implementation, a rotatable range of the glasses leg 2 and the second connecting member 4 is designed to be larger, to increase a movable range of the glasses leg 2 relative to the second connecting member 4 and the main body 1.

In addition, in actual application, the glasses leg 2 and the second connecting member 4 may be designed into a flat strip-shaped or sheet-shaped structure, so as to improve the aesthetics of the glasses. The entire elastic member may be located at an inner side of the glasses leg 2 and the second connecting member 4, that is, at a side closer to a wearer, to improve the overall aesthetics of the glasses. Alternatively, the entire elastic member may be located at an outer side of the glasses leg 2 and the second connecting member 4, that is, at a side away from the wearer. This design is more convenient for the elastic member to play a role of clamping the glasses leg on the wearer's head, and the structure is simple. In addition, a part of the elastic member may alternatively be arranged on the side close to the wearer, and an other part of the elastic member is arranged on the side away from the wearer, so as to design the structure of the second connecting member and the glasses leg. This is not limited in this application.

It may be understood that the hinge between the first end of the second connecting member and the first connecting member allows the second connecting member and the glasses leg to rotate relative to the main body, so that the glasses leg and the main body may be folded, to reduce the volume of the glasses, thereby facilitating storage. The hinge between the second end of the second connecting member and the glasses leg allows the glasses leg to rotate relative to the second connecting member, so that the glasses leg is adapted to the head sizes of different wearers.

In a case that the glasses leg rotates away from the main body, the glasses leg is firstly unfolded, and the second connecting member and the glasses leg synchronously rotate to a position convenient for the wearer to wear. In a case that the glasses leg further rotates away from the main body, the glasses leg rotates relative to the second connecting member to adapt to the size of the wearer's head. In this process, the elastic member is deformed to store energy, and the elastic member has a characteristic of returning to an original state, so that the elastic member drives the glasses leg and the second connecting member to move away from each other, the glasses leg may be fastened on the wearer's head, the glasses are firmly worn, and the flexibility is improved.

In this embodiment, the glasses leg 2 of the glasses is connected to the main body 1 through the connecting device, and the second connecting member 4 of the connecting device is hinged with the glasses leg 2. Therefore, after the glasses leg 2 is hung on an ear, the elastic member can automatically drive the glasses leg 2 to be clamped on the head, so as to achieve a firm wearing effect of the glasses and improve the flexibility.

It should be understood that only a connection structure and a function relationship between one glasses leg and the main body are described above. It may be understood that, the glasses may also have two glasses legs. In a case that there are two glasses legs, one glasses leg is connected to one end of the main body, the other glasses leg is connected to the other end of the main body, and the two glasses legs may be connected to the main body through the connecting devices respectively. It may be understood that, rotation directions of the two glasses legs are opposite.

Figure 4:
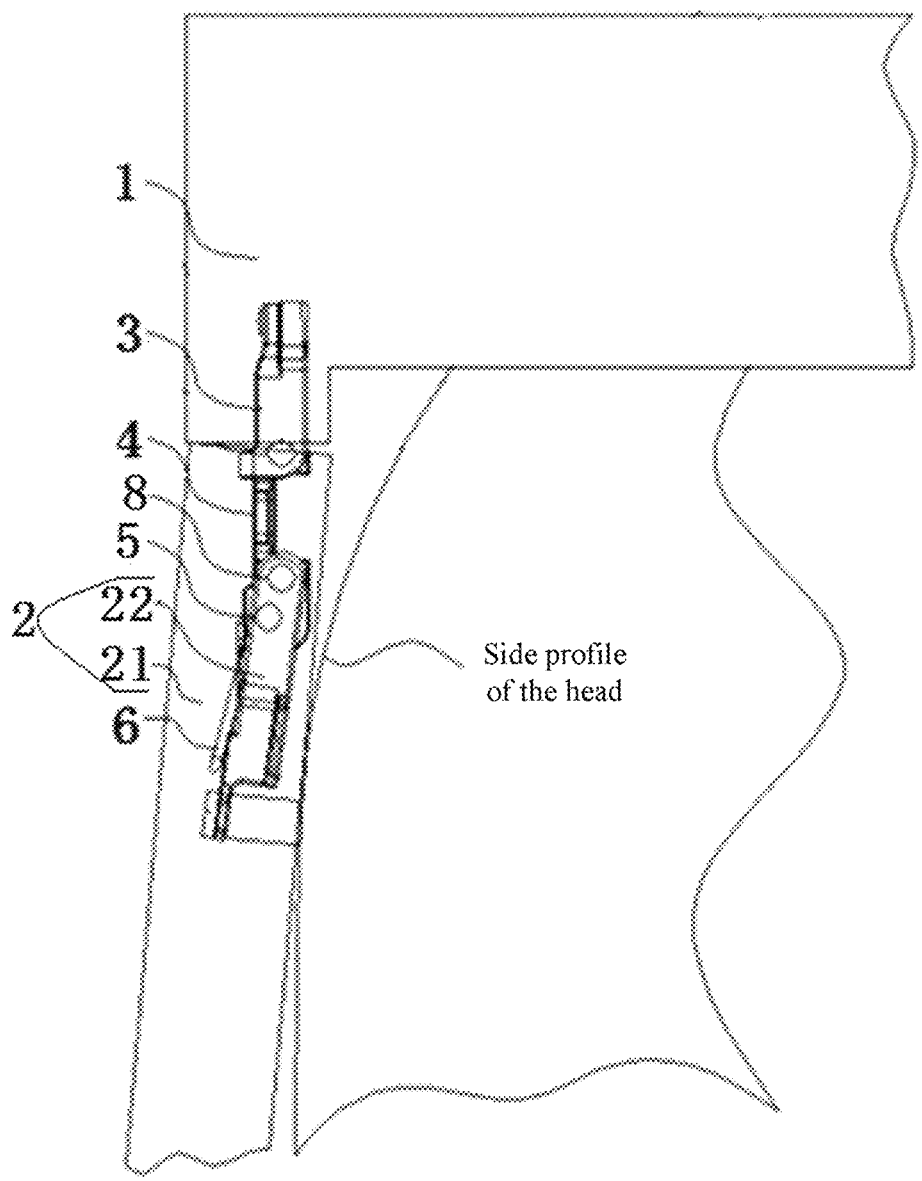
FIG. 4 is a schematic structural diagram in which glasses are worn on a head according to an embodiment of this application.

In an example shown in FIG. 4, when the glasses in this embodiment of this application are used, the two glasses legs 2 rotate away from the main body and are unfolded. In this case, the glasses legs 2 drive, through the elastic members, the second connecting members 4 to rotate by using hinge points between the second connecting members 4 and the first connecting members 1 as centers. As a width between the two glasses legs 2 increases, after the two glasses legs 2 are hung on ears, the elastic members drive the glasses legs 2 to move close to the main body, so that the two glasses legs 2 are clamped on the head.

In addition, the second connecting member 4 is hinged with the glasses leg 2. After the two glasses legs 2 are unfolded and parallel to each other, if the width between the two glasses legs 2 is still less than a width of the wearer's head, the wearer may respectively pull the two glasses legs 2 outward to increase the width between the glasses legs, and the glasses legs 2 rotate by using the hinge points as the centers. The elastic member is deformed due to a pulling force exerted by the wearer, to produce an elastic force on the glasses leg 2. The glasses legs 2 tend to close to each other under the action of the elastic forces. In this way, the two glasses legs 2 can be clamped on the head of the wearer to ensure the wearing stability. When the wearer takes off the glasses, the two glasses legs 2 rotate around the second connecting members under the action of the elastic members, and move back toward each other.

Figure 2:
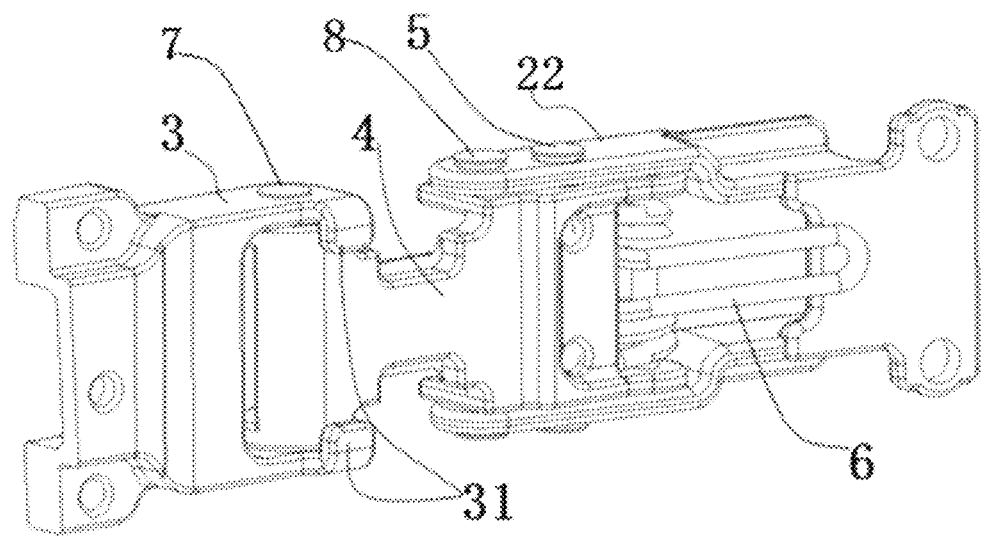
FIG. 2 a schematic structural diagram of an assembled connecting device according to an embodiment of this application.

For example, the wearer may rotate the glasses legs outward by 0-30° by pulling the glasses legs. The glasses in this embodiment also achieves an effect of adjusting the width between the two glasses legs 2 without the deformation of the glasses legs. Finally, the glasses may be used by people with different head widths without additionally setting a plurality of specifications, thereby reducing production costs and procurement costs Optionally, as shown in FIG. 1 and FIG. 2, in an embodiment, the first connecting member 3 includes a first limiting portion 31, and the first limiting portion 31 is arranged on an end of the first connecting member 3 adjacent to the second connecting member 4. In a case that the second connecting member 4 rotates away from the main body 1 relative to the first connecting member 3 to a preset angle range, the second connecting member 4 abuts against the first limiting portion 31, so as to limit the second connecting member and prevent the second connecting member and the glasses leg from further rotating relative to each other, so that the second connecting member 4 and the glasses leg 2 rotate within a range between the main body 1 and the first limiting portion 31.

Figure 5:
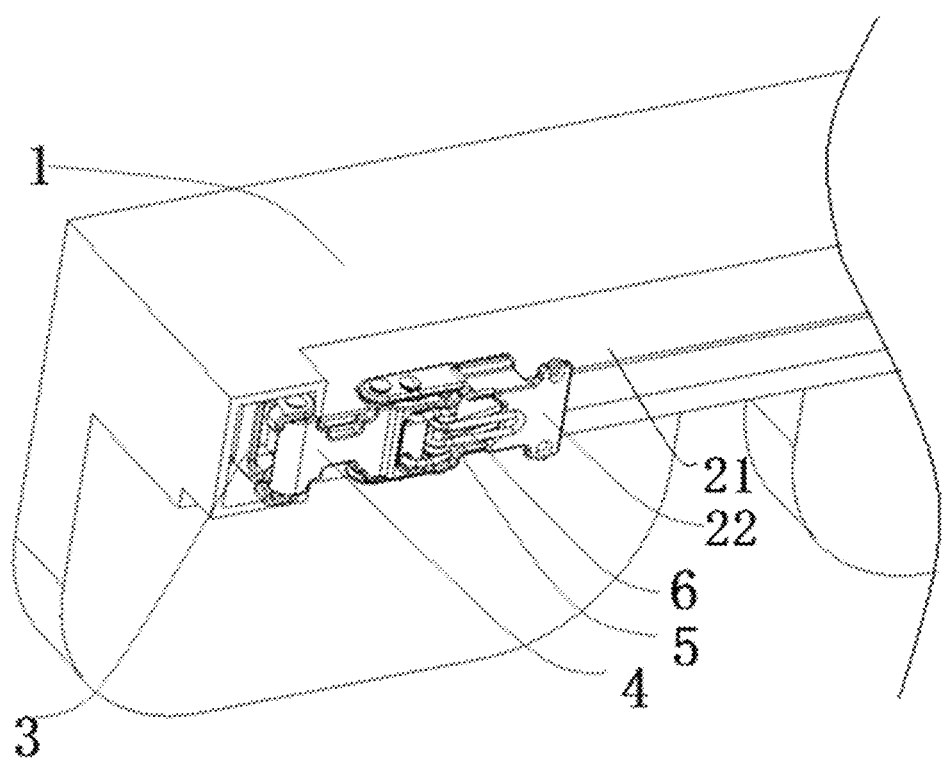
FIG. 5 a structural schematic diagram in which a glasses leg of glasses is folded according to an embodiment of this application.

As shown in FIG. 4, the first limiting portion 31 may be arranged on a side of the first connecting member 3 away from the main body. When the second connecting member 4 rotates by 90° away from the main body 1, the second connecting member 4 abuts against the first limiting portion 31. As shown in FIG. 5, when the second connecting member 4 rotates by 90° close to the main body 1, one of the glasses legs 2 abuts against the main body 1. In this case, the second connecting members 4 on two ends of the main body 1 are parallel to each other, and the glasses legs 2 on the two ends of the main body 1 are parallel to each other.

A rotatable angle of the second connecting member 4 is not limited to 90°, and may be less than 90° or greater than 90°. A person skilled in the art may set a shape and a position of the first limiting portion according to an actual requirement, so as to limit a movable angle range of the second connecting member 4.

Further, the first limiting portion 31 may be arranged on an upper end surface or a lower end surface of an end of the first connecting member 3 adjacent to the second connecting member 4. When the second connecting member 4 rotates away from the main body, a part of the second connecting member 4 abuts against the first limiting portion 31. Optionally, the first limiting portion 31 is a sheet-shaped structure extending from the first connecting member 3. When the second connecting member 4 abuts against the first limiting portion 31, a surface of the first limiting portion and a surface of the second connecting member 4 are in contact with a surface of the sheet-shaped first limiting portion 31.

As shown in FIG. 1 and FIG. 2, the first limiting portion 31 and the first connecting member 3 may be integrally formed to improve an overall strength. The first limiting portion 31 and the first connecting member 3 are not limited to integral forming, and may also be any one of welding, riveting, or bolt connection. A person skilled in the art may set a connection relationship between the first limiting portion 31 and the first connecting member 3 according to an actual requirement.

By arranging the first limiting portion, a phenomenon of excessive pulling can be avoided when the wearer pulls the glasses leg from a position close to the main body to a position away from the main body. The first limiting portion can limit a maximum rotational posture of the second connecting member relative to the main body, so that the glasses can be worn on the head normally and stably.

Optionally, in an embodiment, the second end 42 of the second connecting member 4 is provided with a second limiting portion, the second limiting portion has a preset limit angle, and the glasses leg 2 can rotate within the preset limit angle. Because the glasses leg 2 is rotatable within the preset limit angle as limited by the second limiting member, the degree of rotation of the glasses leg 2 can be controlled.

For example, the preset limit angle is ±30°. That is, when the glasses leg 2 automatically rotates inward by 30° under the driving of the elastic member, the glasses leg abuts against a part of the second limiting portion, and stops the inward rotation.

When the glasses leg 2 is pulled outward by using a hand to rotate outward by 30°, the glasses leg abuts against another part of the second limiting portion, and stops the outward rotation. In this case, the width between the two glasses legs 2 may be increased for people with a large head width to use.

The preset limit angle of the second limiting portion for the glasses leg 2 is not limited to ±30°. A person skilled in the art may set the limit angle of the second limiting portion according to an actual requirement.

Inconvenience caused by excessive rotation of the glasses leg relative to the second connecting member may be effectively avoided by arranging the second limiting portion. In addition, it can also reduce a risk of damage to the glasses and a risk of breakage between the glasses leg and the second connecting member.

Figure 3:
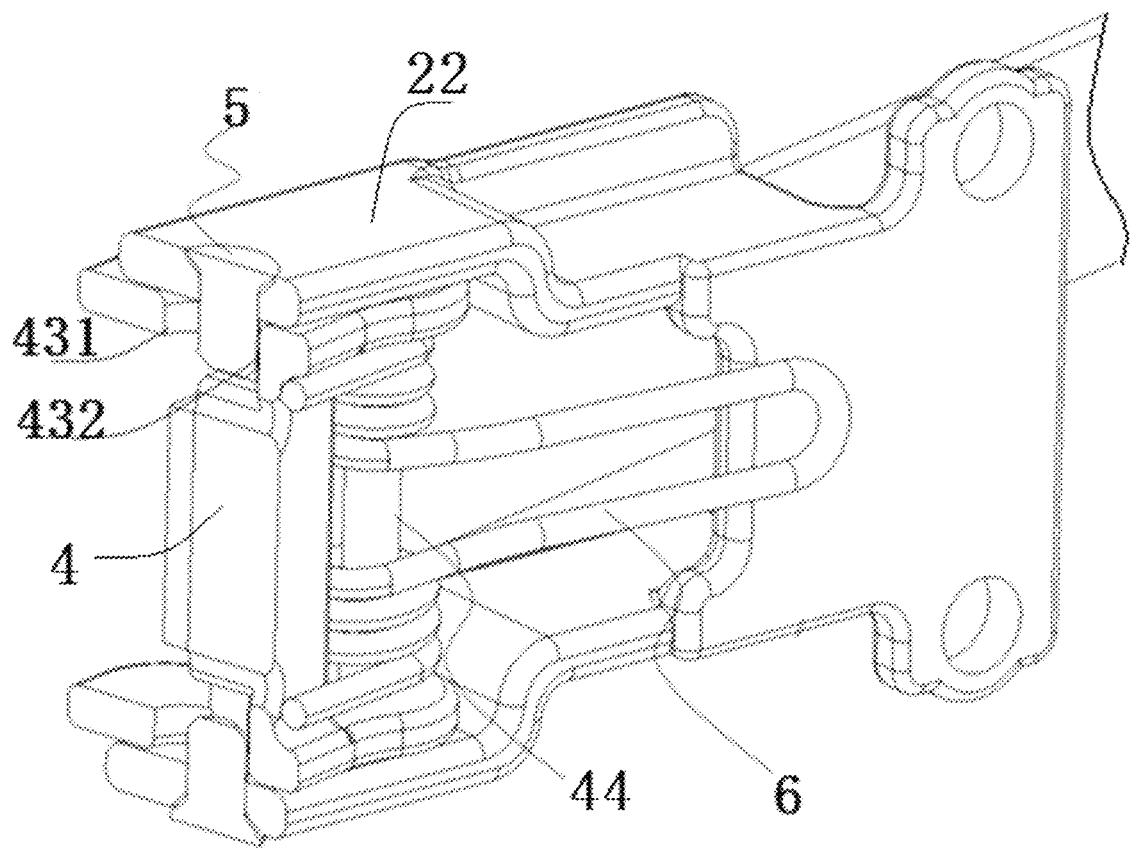
FIG. 3 is a schematic cross-sectional structural view of a connecting device according to an embodiment of this application.

Optionally, as shown in FIG. 1 and FIG. 3, in an embodiment, the second limiting portion includes a first through hole 43, a first columnar portion 5 is arranged between the glasses leg 2 and the second connecting member 4, and the first columnar portion 5 is movable in the first through hole 43.

For example, the first through hole 43 is provided on the second end 42 of the second connecting member 4, the first columnar portion 5 is arranged on the glasses leg 2, and the first columnar portion 5 is inserted into the first through hole 43. A diameter of the first through hole 43 is greater than a diameter of the first columnar portion 5, so that the first columnar portion 5 is movable within the first through hole 43.

As shown in FIG. 3, for example, when the glasses leg 2 automatically rotates close to the main body under the driving of the elastic member by 30°, the first columnar portion 5 on the glasses leg 2 abuts against a first side hole wall 431 of the first through hole 43 of the second connecting member 4, to limit the glasses leg 2. Through a limiting action of the first through hole 43, the glasses leg 2 cannot rotate further.

As shown in FIG. 3, for example, when the wearer pulls the glasses leg 2 away from the main body 1 and rotates the glasses leg 2 away from the main body 1 by 30°, the first columnar portion 5 on the glasses leg 2 abuts against a second side hole wall 432 of the first through hole 43 of the second connecting member 4, to limit the glasses leg. Through a limiting action of the first through hole 43, the glasses leg 2 cannot be pulled further away from the main body, and stops the outward rotation. In this case, the width between the two glasses legs 2 may be increased for people with the large head width to use.

In this application, sizes of the first columnar portion and the first through hole may be preset, to limit the rotatable angle of the glasses leg relative to the second connecting member, so as to facilitate the use and pulling of the wearer without occurrence of excessive pulling of the glasses leg. For example, in a design that the diameter of the first through hole is fixed, a larger diameter of the first columnar portion indicates a smaller rotatable angle range of the glasses leg relative to the second connecting member; and a smaller diameter of the first columnar portion indicates a larger rotatable angle range of the glasses leg relative to the second connecting member. Alternatively, in a design that the diameter of the first columnar portion is fixed, a smaller diameter of the first through hole indicates a smaller rotatable angle range of the glasses leg relative to the second connecting member; and a larger diameter of the first through hole indicates a larger rotatable angle range of the glasses leg relative to the second connecting member.

An advantage of this configuration of the second limiting portion is that the second limiting portion and the through hole have a good and stable relationship. The second limiting portion and the first columnar portion form a plug-in relationship, which is not easy to loose, separate from each other, and cause a limit failure. Moreover, the processing and assembly process of this structure is simple.

In addition to the foregoing structure, the second limiting portion may also be implemented by using another structure.

Optionally, the second limiting portion may use a sheet-shaped extension structure similar to the first limiting portion. A sheet-shaped structure may extend from a position away from the main body on the second connecting member, to limit the position of the glasses leg. In a case that the glasses leg is pulled away from the main body under the action of an external force, the glasses leg abuts against the sheet-shaped structure after rotating by a certain angle. The second limiting portion of the sheet-shaped structure may limit the glasses leg.

Optionally, a sheet-shaped structure, as an other half structure of the second limiting portion, may also extend from a position close to the main body on the second connecting member. In a case that the glasses leg is not pulled by the external force, the surface of the glasses leg may abut against the sheet-shaped structure on the second connecting member close to the main body under the action of the elastic member, to limit the glasses leg.

In the above implementation, the second limiting portion can also limit the glasses leg, and the structure is simple and easy to assemble. By designing a distance between the two sheet-shaped structures, the rotatable angle range of the glasses leg may be limited. For the use of the sheet-shaped structure as the second limiting portion, the two sheet-shape structures may be designed according to an actual product requirement to limit the angles in two directions, or only one of the sheet-shaped structures may be selected, to limit the angle in one direction.

As shown in FIG. 1 to FIG. 5, in an embodiment, the elastic member is a torsion spring 6, and the torsion spring 6 is arranged on the second connecting member 4 through a mounting shaft 44. A first torsion arm 61 of the torsion spring 6 is configured as the first elastic end, the first torsion arm 61 abuts against the glasses leg 2, a second torsion arm 62 of the torsion spring 6 is configured as the second elastic end, and the second torsion arm 62 abuts against the second connecting member 4. The material of the torsion spring 6 is any one of a silicon manganese spring steel wire, a chrome vanadium spring steel wire, or a chrome silicon spring steel wire. The first torsion arm 61 of the torsion spring 6 may store and release elastic potential energy generated by the rotation of the glasses leg 2. The torsion spring 6 can produce a stable and reliable elastic force on the second connecting member and the glasses leg that are in rotatable engagement, so that the glasses leg can produce a clamping force close to the wearer's head. The first torsion arm and the second torsion arm of the torsion spring abut against the glasses leg and the second connecting member respectively, to effectively transmit the elastic force.

Optionally, in order to further improve the stability of the first torsion arm and the second torsion arm abutting against the two components, a counterbore may be formed on the second connecting member and/or the glasses leg. End portions of the first torsion arm and the second torsion arm may be bent and inserted into the counterbore, so as to avoid dislocations of the torsion arms relative to the components against which the torsion arms abut. In addition, a positioning groove may alternatively be provided on the second connecting member and/or the glasses leg to limit the position of the torsion arm.

For the way that the torsion spring is assembled on the second connecting member and the glasses leg, in an optional implementation shown in FIG. 1, a first mounting hole 45 is provided on the second connecting member 4, the mounting shaft 44 is arranged in the first mounting hole 45, and the torsion spring 6 is sleeved over the mounting shaft 44. During mounting, an annular part of a middle part of the torsion spring 6 is sleeved over the mounting shaft 44, and the mounting shaft 44 is fixed on the second connecting member 4 through the first mounting hole 45. By arranging the mounting shaft for the torsion spring to sleeve over, the stability of the torsion spring arranged on the second connecting member can be effectively increased, and the reliability of elastic rotatable engagement between the glasses leg and the second connecting member can be improved.

As shown in FIG. 1 and FIG. 2, in an embodiment, the first torsion arm 61 abuts against a side of the glasses leg 2 away from the main body 1; and the second torsion arm 62 abuts against a side of the second connecting member 4 away from the main body 1. In this way, once the glasses leg is pulled and rotates away from the main body, the torsion spring can produce an elastic force, to cause the glasses leg to tend to move close to the main body. Further, the torsion spring may have a certain pre-tightening force, so that the first torsion arm 61 of the torsion spring 6 always exerts a thrust on the glasses leg 2 to cause the glasses leg to rotate close to the main body, so as to achieve an automatic clamping effect of the glasses leg 2. After the wearer wears the glasses, the glasses leg can be clamped on the wearer's head under the elastic force to improve the wearing reliability.

Optionally, the elastic member may alternatively be an elastic member such as a leaf spring or an elastic rubber that can generate the elastic force.

Optionally, the elastic member is the leaf spring. A middle part of the leaf spring is fixed on the second connecting member 4. The fixing method may be welding or bolting on the second connecting member 4. A person skilled in the art may set a connection manner for the leaf spring according to an actual requirement.

For example, a first torsion arm of the leaf spring is configured as the first elastic end, and the first torsion arm abuts against a side of the glasses leg 2 away from the main body 1. A second torsion arm of the leaf spring is configured as the second elastic end, and the second elastic end abuts against a side of the second connecting member 4 away from the main body 1. That is, the first torsion arm of the leaf spring always releases a thrust on the glasses leg 2 to cause the glasses leg to rotate inward, so as to achieve the automatic clamping effect of the glasses leg 2. The leaf spring is assembled in a simpler way, and the connection relationship between the second connecting member and the glasses leg can be simplified. In addition, the leaf spring can also provide a stable elastic deformation force.

As shown in FIG. 1, FIG. 2, and FIG. 4, in an embodiment, the glasses leg 2 includes a leg body 21 and a third connecting member 22 connected to the leg body 21, and the third connecting member 22 is hinged with the second end 42 of the second connecting member 4. The elastic member is located between the third connecting member 22 and the second connecting member 4, the first elastic end of the elastic member abuts against the third connecting member 22, the second elastic end of the elastic member abuts against the second connecting member 4, and in a case that the third connecting member 22 rotates away from the main body 1, the elastic member drives the third connecting member 22 and the second connecting member 4 to be away from each other.

The leg body 21 is connected to an end of the third connecting member 22 away from the second connecting member 4. Optionally, the connection method is screw connection.

When the glasses of this embodiment are used, the two glasses legs 2 are unfolded outward. In this case, the leg bodies 21 drive the second connecting members 4 to rotate relative to the main body 1 through the third connecting members 22 and the elastic members.

When a width between the two leg bodies 21 increases, and after the leg bodies 21 are hung on ears, the elastic members drive the third connecting members 22 and the leg bodies 21 to move close to the main body 1 (that is, rotate inward), so that the two leg bodies 21 are clamped on the head.

In addition, because the second connecting members 4 are hinged with the third connecting members 22, and the leg bodies 21 are fixedly connected to the third connecting members 22, after the second connecting members and the leg bodies 21 are fully unfolded relative to the main body 1 and parallel to each other, if the width between the two leg bodies 21 is still less than the width of the wearer's head, the wearer can rotate the two leg bodies 21 outward respectively to increase the width, and the leg bodies 21 drive the third connecting members 22 to rotate by using hinge points as axis centers, for example, the third connecting members rotate by 1° to 30°. Therefore, the leg bodies 21 drive the third connecting members 22 to rotate away from the main body 1. In this case, the elastic members are elastically deformed to generate an elastic force. After the glasses are worn, the elastic members drive the third connecting members 22 and the leg bodies 21 to clamp toward directions of the glasses legs 2 close to the main body 1.

By designing the third connecting member and the leg body, the structure and materials of the glasses can be more diversified. The third connecting member may be made of materials that have good structure strength and are conducive to achieving stable rotatable connection. The leg body may be made of materials that have good skin affinity and more beautiful appearance. This design method can better meet a performance requirement of the glasses.

As shown in FIG. 1, in an embodiment, the first connecting member 3, the second connecting member 4, and the third connecting member 22 are all channel plates, the first end 41 of the second connecting member 4 is sleeved in an end of the first connecting member 3, the second end 42 of the second connecting member 4 is sleeved in an end of the third connecting member 22, and the first columnar portion 5 is arranged on a second mounting hole 222 of the third connecting member 22, and inserted in the first through hole 43 of the second connecting member 4, so that the degree of rotation of the third connecting member 22 and the leg body 21 can be controlled.

On one hand, areas of the components can be increased by configuring the components as the channel plates, so as to improve the wearing comfort of the wearer and reduce possible wearing discomfort caused by applying the force. On the other hand, the strength of the channel plate structure is higher, and the structural reliability of each connecting member is improved.

The first connecting member 3, the second connecting member 4, and the third connecting member 22 are not limited to the channel plates. A person skilled in the art may set shapes of the first connecting member 3, the second connecting member 4, and the third connecting member 22 according to actual requirements.

As shown in FIG. 1, in an embodiment, opposing first hinge holes 32 are respectively provided on two side wall plates at an end of the first connecting member 3. Opposing second hinge holes 46 are respectively provided on two side wall plates at the first end 41 of the second connecting member 4. Opposing third hinge holes 47 are respectively provided on two side wall plates at the second end 42 of the second connecting member 4. Opposing fourth hinge holes 221 are respectively provided on two side wall plates at an end of the third connecting member 22, the first hinge holes 32 and the second hinge holes 46 overlap and are hinged by first shafts 7, and the third hinge holes 47 and the fourth hinge holes 221 overlap and are hinged by second shafts 8.

As shown in FIG. 1, in an embodiment, the first connecting member 3, the second connecting member 4, and the third connecting member 22 are respectively provided with weight reduction holes to reduce an overall weight of the connecting device. The weight reduction holes may be opened on the connecting members and are parts that are not hinged or fixedly connected to other components. For example, in an implementation where each connecting member is the channel plate, the weight reduction hole may be opened on a surface with a largest area of the channel plate, that is, on a side plate of each connecting member. This can not only reduce weight, but also beautify the appearance of the glasses.

It should be further noted that, in this article, terms "comprise", "include", and any variants thereof are intended to cover a non-exclusive inclusion. Therefore, in the context of a process, method, object, or device that comprises a series of elements, the process, method, object, or device not only comprises such elements, but also comprises other elements not specified expressly, or may include inherent elements of the process, method, object, or device. Without more limitations, elements defined by the sentence "comprising one" does not exclude that there are still other same elements in the processes, methods, objects, or apparatuses. In addition, it should be noted that the scope of the method and device in the implementations of this application is not limited to performing functions in the order shown or discussed, but may also include performing, according to involved functions, the functions basically simultaneously or in a reverse order. For example, the described method may be performed a sequence different from the sequence described, and various steps may be added, omitted, or combined. In addition, features described in some examples may also be combined in other examples.

The embodiments of this application have been described above with reference to the accompanying drawings. This application is not limited to the specific embodiments described above, and the specific embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. Glasses comprising:
   a main body;
   a glasses leg; and
   a connecting device, wherein the glasses leg is connected to an end portion of the main body through the connecting device in such a way that the glasses leg is rotatable; and the connecting device comprises:
   a first connecting member, a second connecting member, and an elastic member, wherein the first connecting member is arranged on the end portion of the main body, a first end of the second connecting member is hinged with the first connecting member, a second end of the second connecting member is hinged with the glasses leg, and the elastic member is located between the second connecting member and the glasses leg, wherein a first elastic end of the elastic member abuts against the glasses leg, a second elastic end of the elastic member abuts against the second connecting member, and in a case that the glasses leg rotates away from the main body, the elastic member drives the glasses leg and the second connecting member to be away from each other, wherein the first connecting member comprises a first limiting portion, the first limiting portion is arranged on an end of the first connecting member adjacent to the second connecting member, and in a case that the second connecting member rotates away from the main body relative to the first connecting member, the second connecting member abuts against the first limiting portion to limit the second connecting member.

2. The glasses according to claim 1, wherein the second end of the second connecting member is provided with a second limiting portion, the second limiting portion has a preset limit angle, and the glasses leg is rotatable within the preset limit angle.

3. The glasses according to claim 2, wherein the second limiting portion comprises a first through hole, a first columnar portion is arranged between the glasses leg and the second connecting member, and the first columnar portion is movable in the first through hole.

4. The glasses according to claim 1, wherein the elastic member is a torsion spring, and the torsion spring is arranged on the second connecting member through a mounting shaft, wherein a first torsion arm of the torsion spring is configured as the first elastic end, the first torsion arm abuts against the glasses leg, a second torsion arm of the torsion spring is configured as the second elastic end, and the second torsion arm abuts against the second connecting member.

5. The glasses according to claim 4, wherein a first mounting hole is provided on the second connecting member, the mounting shaft is arranged in the first mounting hole, and the torsion spring is sleeved over the mounting shaft.

6. The glasses according to claim 4, wherein the first torsion arm abuts against a side of the second connecting member away from the main body; and the second torsion arm abuts against a side of the glasses leg away from the main body.

7. The glasses according to claim 1, wherein the elastic member is a leaf spring, a middle part of the leaf spring is fixed on the second connecting member, a first torsion arm of the leaf spring is configured as the first elastic end, and the first torsion arm abuts against a side of the glasses leg away from the main body; and a second torsion arm of the leaf spring is configured as the second elastic end, and the second elastic end abuts against a side of the second connecting member away from the main body.

8. The glasses according to claim 1, wherein the glasses leg comprises a leg body and a third connecting member connected to the leg body, the third connecting member is hinged with the second end of the second connecting member, and the elastic member is located between the third connecting member and the second connecting member, wherein the first elastic end of the elastic member abuts against the third connecting member, the second elastic end of the elastic member abuts against the second connecting member, and in a case that the third connecting member rotates away from the main body, the elastic member drives the third connecting member and the second connecting member to be away from each other.

9. The glasses according to claim 8, wherein the first connecting member, the second connecting member, and the third connecting member are all channel plates, the first end of the second connecting member is sleeved in an end of the first connecting member, and the second end of the second connecting member is sleeved in an end of the third connecting member.

* * * * *